United States Patent [19]

Powers et al.

[11] 4,354,875
[45] Oct. 19, 1982

[54] CONTROLLING THE CURING TIME OF ALKALI METAL SILICATES USING DERIVATIVES OF GLYOXAL

[75] Inventors: Larry J. Powers, Madison; Thomas M. Vickers, Willoughby, both of Ohio

[73] Assignee: Diamond Shamrock Corporation, Dallas, Tex.

[21] Appl. No.: 316,857

[22] Filed: Oct. 30, 1981

[51] Int. Cl.$^3$ ............................................... C09J 1/02
[52] U.S. Cl. ............................................. 106/74; 106/84; 106/948; 166/293; 166/294; 405/263; 405/264; 405/267
[58] Field of Search ................. 106/74, 84, DIG. 900; 166/293, 294; 405/263, 264, 267

[56] References Cited

U.S. PATENT DOCUMENTS

| | | | |
|---|---|---|---|
| 3,028,340 | 4/1962 | Gandon et al. | 252/313 |
| 3,202,214 | 8/1965 | McLaughlin | 166/293 |
| 3,864,137 | 2/1975 | Van Bonin et al. | 106/75 |
| 4,056,937 | 11/1977 | Suzuki | 106/74 X |
| 4,293,340 | 10/1981 | Metz | 106/74 |

FOREIGN PATENT DOCUMENTS 54-107926  8/1979  Japan ....................... 106/74

*Primary Examiner*—Helen M. McCarthy
*Attorney, Agent, or Firm*—Helen P. Brush

[57] ABSTRACT

A liquid alkali metal silicate composition comprises water, an alkali metal, e.g., sodium silicate, and as curing agent for said alkali metal silicate, a derivative of glyoxal which is 2,3-dihydroxy-1,4-dioxane or glyoxal trimer. The composition optionally contains a Group I-III metal salt, e.g., calcium chloride and hydrogen peroxide. It is easily pumpable and injectable at a temperature of 100° F. or higher.

12 Claims, No Drawings

CONTROLLING THE CURING TIME OF ALKALI METAL SILICATES USING DERIVATIVES OF GLYOXAL

BACKGROUND OF THE INVENTION

1. Field of the Invention

This invention relates to compositions and to processes for controlling the gelation time of alkali metal silicate-containing compositions. More specifically, it relates to compositions and processes for controlling the gelation time of alkali metal silicate-containing compositions useful for, e.g., stabilizing soil, by incorporating therein certain derivatives of glyoxal, which derivatives modify the gel time of the silicate whereby homogeneous gelled compositions can be prepared even at elevated temperatures, e.g., 100° F. or higher.

2. Description of the Prior Art

It has long been known to produce gelled, cement-like masses from aqueous solutions of alkali metal silicates by the addition of salts of metals other than alkali metals, e.g., aluminum or iron. It is further known, as set forth in U.S. Pat. No. 2,968,572 (Peeler), to render soil impermeable to fluid and/or to strengthen it by injecting into said soil a composition comprising an aqueous alkali metal, e.g., sodium silicate and a soluble amide such as formamide, acetamide, propionamide, butyramide and the like. During gelation of such compositions and thereafter, however, gaseous ammonia is liberated by the silicate-amide reaction, constituting a hazard to those working nearby, particularly in confined areas.

The alkali metal silicate-containing soil stabilizing compositions described and claimed in U.S. Pat. No. 3,306,758 (Miller), issued Feb. 28, 1967, represents an improvement over the invention set forth in the aforesaid U.S. Pat. No. 2,968,572 in that a lower alkyl aldehyde, e.g., formaldehyde, acetaldehyde and the like, is incorporated into the silicate-amide mixture as a binding or complexing agent for the ammonia generated during the gelling reaction. Thus, no significant quantities of ammonia vapors are released upon applying and reacting the silicate and amide components.

U.S. Pat. No. 3,028,340 (Gandon, et al.), issued Apr. 3, 1962, describes and claims a composition suitable for soil stabilization comprising an alkali metal silicate in combination with the linear dialdehyde, glyoxal, as hardener for the silicate. Although safer to apply than the aforesaid silicate-formamide formulations since they generate no hazardous ammonia vapors, such silicate-glyoxal compositions oftentimes gel too rapidly for practical application, particularly when used at elevated temperatures.

SUMMARY OF THE INVENTION

We have now found that the gel time of alkali metal silicate soil-stabilizing compositions may be inibited by incorporating into said silicate compositions in place of glyoxal certain derivatives thereof. The gel times of the resulting compositions are sufficiently inhibited to allow for their satisfactory application at elevated temperatures to provide homogeneous soil stabilization, particularly in subterranian sites.

DESCRIPTION OF THE PREFERRED EMBODIMENTS

As used herein in the specification and claims, the term "alkali metal silicate" is intended to refer to alkali metal silicates having an alkali metal oxide:silicon dioxide weight ratio within the range from about 1.0:3.0–4.0, notably, sodium silicates having a sodium oxide:silicon dioxide weight ratio within the range from about 1.0:3.0–4.0, preferably about 1.0:3.5. In practice, either an anhydrous alkali metal silicate, e.g., sodium metasilicate, or a silicate solution as commercially obtained, may be employed herein as the alkali metal silicate component. The anhydrous material will, of course, be dissolved in sufficient water to provide a solution of the desired solids concentration. An especially preferred material is an aqueous sodium silicate having a sodium oxide:silicon dioxide ratio of about 25:50 percent, most preferably $Na_2O$-$SiO_2$ solids content of about 35:45 percent by weight. The term "alkali metal," as used in the specification and claims, is intended to refer to the various alkali metals, i.e., sodium, potassium, lithium, rubidium, cesium, and mixtures thereof. Silicates of potassium and sodium are more generally available. In particular, sodium silicate solutions, being commercially available in a wide variety of solids concentrations and $Na_2O$:$SiO_2$ ratios, are more widely used and are presently preferred in practice of the invention. Accordingly, particular reference is made hereinafter to sodium silicates. The silicate may be employed undiluted as purchased, or it may be diluted with water.

In one embodiment of this invention, the glyoxal derivative used instead of glyoxal per se as the curing agent, i.e., acidogen, for the alkali metal silicate is 2,3-dihydroxy-1,4-dioxane which generates glyoxal "in situ." This compound is known, and can be synthesized by reacting together glyoxal and ethylene glycol according to the method reported by Frank S. H. Head in *J. Chem. Soc.*, "An addition Compound of Glyoxal and Ethylene Glycol," 1955, pp. 1036–37.

In the other embodiment of the invention, glyoxal trimer is employed, reacting "in situ" to supply acidogen for curing the alkali metal silicate. Glyoxal trimer is likewise a known compound and is available commercially. Both of the aforesaid glyoxal derivatives are solids at room temperature, but dissolve readily in contact with water and/or the alkali metal silicate solution.

In present practice of either of the aforementioned embodiments of this invention, a Group I-III reactive metal salt and/or hydrogen peroxide are also included in the alkali metal silicate formulation. In particular, the reactive metal salt is incorporated when a completely water-insoluble gel is desired, since it reacts quickly with the silicate to form the water-insoluble gel. The term "reactive salt" is intended to mean those Group I-III metal salts which chemically react with aqueous alkali metal silicates to produce a substantially water-insoluble gel. Specific reactive salts include sodium aluminate, aluminum chloride, copper sulfate, zinc chloride and calcium chloride, with calcium chloride being preferred. When a reactive salt is used, it generally is incorporated as an aqueous solution wherein the concentration of salt is within the range of from about 25 grams per liter of solution up to saturation. The amount of reactive salt employed, of course, should be insufficient to form a satisfactory gel if used alone with the silicate. When employed, the aqueous salt, e.g., a 5 weight/volume percent calcium chloride solution generally comprises 0.001–12.0 percent, preferably 0.30–5.00 percent, by volume, of the total composition.

Also, hydrogen peroxide ($H_2O_2$) may be used as a curing accelerator, together with the glyoxal derivatives used herein as curing agents for the alkali metal silicate. In practice, it generally may be satisfactorily employed alone or, alternatively, in combination with a Group I–III reactive salt as heretofore described. The hydrogen peroxide normally will be employed in solution at a concentration of 3–4 percent, by weight. On a volume basis, $H_2O_2$ (a 3.47 weight percent solution) typically is incorporated in an amount ranging from 0.33 to 5.00 percent per liter of composition.

Regarding the proportion of glyoxal derivative used, quantities of each are employed that will supply or generate in the formulation approximately the same quantity of glyoxal as used in straight silicate-glyoxal formulations heretofore. Accordingly, from 0.25 to 1.05 moles of 2,3-dihydroxy-1,4-dioxane generally will be employed per liter of composition. From 0.08 to 0.35 moles generally, and preferably from 0.12 to 0.25 moles of glyoxal trimer will be used per liter of composition.

The compositions of this invention will, of course, incorporate sufficient water to render them fluid. Generally, at least a portion of the necessary water will be supplied by using a commercial aqueous alkali metal silicate as described above, with additional water being supplied, if desired, as by admixture of the water with the glyoxal and/or with any reactive salt solution when employed. It will be appreciated, of course, that the amounts of glyoxal derivatives, added water and optionally hydrogen peroxide and/or reactive salt used in proportion to the silicate, as well as the amount of soil treated with a given quantity of such a composition, varies widely depending upon the porosity, permeability and type of soil, nature of the substrata, if subsoil applications are intended, and the like. Accordingly, it generally is not feasible to define in terms of proportions a composition which represents an optimum material for use in all types of soil solidification and/or stabilization operations.

However, effective soil stabilization compositions of the present invention generally comprise, from about 10 to 70 percent, preferably about 30 to 50 percent, by volume, of an aqueous alkali metal silicate having an alkali metal oxide:silicon dioxide weight ratio within the range of 1.0:3.0–4.0; about 0.25 to 1.05 moles of 2,3-dihydroxy-1,4-dioxane (or from 0.08 to 0.35 mole of glyoxal trimer) per liter of composition; optionally about 0.001 to 0.13 mole, preferably about 0.003 to 0.052 mole of hydrogen peroxide per liter of composition; optionally about 0.001 to 0.025 mole of Group I–III reactive salt per liter of composition; and the balance of the soil stabilizing composition being added water (water in addition to that separately admixed with either alkali silicate, glyoxal, hydrogen peroxide or reactive salt). No water need be added or it may be present in an amount of 0.5 to 8.5 times the volume of aqueous commercial silicate used. However, at temperatures greater than room temperature, and when a high-strength gel is required, it is better to add little, if any, water to the aqueous commercial silicate.

The compositions of this invention may be used particularly for increasing the load-bearing capacity of soils, for arresting settlement and lateral movement of foundations, and for controlling the flow of water in subterranean engineering projects such as tunnels and mines. The term "soil," as used in the specification and claims, is intended to refer to various types and compositions of soil, including sand, loam, porous or fissured rock, and the like, for example, as described in pages 614–633 of Vol. 12 of the *Kirk-Othmer Encyclopedia of Chemical Technology*, First Ed.

The soil stabilizing compositions of this invention provide many advantages to the routineer. They are easily pumpable liquids which may be simply injected into the soil site. They accomplish soil stabilization in customized gel times economically. Finally, the soil stabilizing compositions of this invention release no noxious fumes or objectionable residues which could constitute a health hazard to persons applying them.

In addition to their utility as soil stabilizing materials, the compositions of this invention may likewise be useful, either by themselves or in combination with other adjuvants, as coatings for imparting strength, water-impermeability, fire resistance and/or chemical corrosion resistance to paper, roofing materials, wood, textiles, metal surfaces, water lines, and structural materials, e.g., building materials of various composition or insulation. They may also be employed as adhesives for binding, gluing, briquetting, pelletizing or agglomerating materials such as flooring, asbestos, roofing granules and the like, and as absorbing or adsorbing materials for encapsulating, confining or otherwise fixing liquids, gases or solids hazardous to the environment. Further, these compositions, either as gels or in hardened granular form, may find utility as chemical carriers and as flocculants for purifying and disinfecting water.

For a fuller understanding of the nature and objects of this invention, the following specific examples are given. These examples, however, are not to be construed as limiting the invention in any way.

EXAMPLE 1

Preparation of 2,3-Dihydroxy-1,4-dioxane

Mixed together were 150 g. of a 40 percent, by weight, glyoxal solution and 64.17 g. of ethylene glycol, providing, on a molar basis, 1.034 moles of each reactant. This mixture was maintained in vacuo over phosphorous pentoxide for approximately two weeks, during which time the mixture substantially solidified. The solids were separated from the syrupy liquid fraction by adding acetone to the mixture and filtering. After drying, the isolated crystals weighed 110.8 g., or 89.2 percent of the theoretical yield (124.2 g.), with a melting point of 103°–106° C. A portion of the material was recrystallized from acetone. Colorless crystals were obtained with a melting point of 100°–101° C.

EXAMPLE 2

A silicate composition was prepared incorporating the recrystallized 2,3-dihydroxy-1,4-dioxane as follows.

Eighty ml. (80 ml. or 112 g.) of Grade 40 sodium silicate solution was poured into a container which was positioned in a water bath maintained at 100° F. A solution was prepared by adding 11.3 g. of the 2,3-dihydroxy-1,4-dioxane product of Example 1 to 120 ml. of water. This solution was then blended with the sodium silicate at 100° F. The gelling time of the blended material was determined with a Brookfield viscometer (Model RVT) using the No. 3 spindle at 100 rpm.

The timer was started when the reactants were combined and stopped when the mixture gelled. Using this procedure, the gel time of the silicate and 2,3-dihydroxy-1,4-dioxane composition was 35 minutes at 100° F.

The gel time of a silicate composition which employed glyoxal as the acidogen was 11 minutes at 100° F.

EXAMPLE 3

Following the procedures of Example 2, a silicate composition was prepared at 100° F., employing 80 ml (112 g) of Grade 40 sodium silicate solution. To this solution was added, with blending, 11.3 g of 2,3-dihydroxy-1,4-dioxane, 10 ml of 5 percent weight/volume solution of calcium chloride (providing 0.25 percent salt per liter of composition) and 110 ml of water to give a total volume of 200 ml. Viscosity of the composition was measured with timing until it gelled. Using this procedure, the gel time of this composition was approximately ten minutes. Thus, calcium chloride is an efficient gelling accelerator for the silicate, along with the 2,3-dihydroxy-1,4-dioxane as curing agent therefor.

EXAMPLES 4 AND 5

Again following the blending procedure according to Example 2, formulations were prepared at 100° F. employing 80 ml (112 g) of the Grade 40 sodium silicate solution, 11.3 g of 2,3-dihydroxy-1,4-dioxane, the 5 weight/volume percent calcium chloride solution and/or 3.47 percent hydrogen peroxide, and water in the amounts shown in the Table below. A formulation containing the same quantities of silicate and 2,3-dihydroxy-1,4-dioxane but with no additives was prepared as a control. After preparation, the gel time of each composition was obtained by time viscosity measurement. Results are as follows:

TABLE 1

| Example | Vol % $CaCl_2$ | Vol % $H_2O_2$ | ml water | Gel Time (min) |
|---|---|---|---|---|
| 4 | — | 0.1735 | 110 | 11.5 |
| 5 | 0.25 | 0.1735 | 100 | 6.0 |
| Control | — | — | 120 | 35.0 |

As can be seen by these results, the gel time of a composition at 100° F. which contains only 2,3-dihydroxy-1,4-dioxane as the acidogen for the silicate (product of Example 2) will be accelerated by incorporating minor quantities of either calcium chloride and/or hydrogen peroxide. Gelling of the composition is accelerated the most by using the aforenamed compounds in combination.

EXAMPLE 6

To determine the compressive strength of each test formulation above, for each test 100 ml of Ottawa sand (ASTM C-109) was measured into each of ten tri-pour beakers containing 36 ml of the composition. Each composition was thoroughly mixed on a vibramixer to remove any trapped air bubbles. The beakers were then capped and stored at room temperature until tested for compressive strength.

Two days after preparation, for each test composition, five of the compact sand samples (5) were removed from their containers and compressive strength measurements made, using an Instron Tester, Model 1123. The load was applied at a rate of 5 mm/minute (or 0.2 inches/minute), recording the maximum load (i.e., pressure) which could be applied to each sample before structural damage occurred. These values were divided by 2.2 square inches, the area of a tri-pour beaker. The other five sand samples were tested in the same manner after seven days aging. The recorded pressure readings were converted to kilograms/cm². The average results obtained are as follows:

TABLE 2

| Composition | Accelerator | Weight/ Volume % | Average Compressive Strength (Kilograms/cm²) | |
|---|---|---|---|---|
| | | | 2 days | 7 days |
| Product of Example 2 | — | — | 3.3 | 3.2 |
| Product of Example 3 | Calcium Chloride | 0.25 | 5.2 | 5.8 |
| Product of Example 4 | Hydrogen Peroxide | 0.17 | 5.3 | 5.6 |
| Product of Example 5 | Calcium Chloride Hydrogen Peroxide | 0.25 0.17 | 7.9 | 7.9 |

EXAMPLE 7

An alkali metal silicate composition was prepared at 100° F., employing the trimer (or trimeric dihydrate) of glyoxal as the acidogen for the silicate as follows.

Into a container positioned in a water bath maintained at 100° F., 120 ml (168 g) of Grade 40 sodium silicate was measured. Using a separate container, 9.9 g of glyoxal trimeric dihydrate was added to 180 ml of water. The resulting solution was then blended into the sodium silicate. After blending, the gel time of the solution was obtained with the Brookfield viscometer, as previously described, using a No. 3 spindle at 100 rpm. The gel time of the formulation at 100° F. was found to be 35 minutes. The same formulation, when prepared and measured at room temperature, exhibited a gel time of 65 minutes.

EXAMPLES 8 AND 9

Following the procedure as outlined above, other formulations of alkali metal silicate with glyoxal trimer modifier were prepared at room temperature. In these formulations, reactive salt, i.e., calcium chloride ($CaCl_2$) solution and/or hydrogen peroxide ($H_2O_2$) solution was employed to determine the gel-accelerating effect of these chemicals on the silicate-trimer composition. The quantities of 5 percent $CaCl_2$ solution and/or 3.47 percent $H_2O_2$ employed are shown on the table below, the total volume of each composition amounting to 400 ml.

TABLE 3

| Example | Additive | Volume-ml | wt/volume-% | Gel Time-min |
|---|---|---|---|---|
| 8 | 5% $CaCl_2$ | 6.67 | 0.083 | 53 |
| 9 | 3.47% $H_2O_2$ | 6.67 | 0.058 | 40 |
| 10 | 5% $CaCl_2$ | 3.33 | 0.042 | 39 |
| | 3.47% $H_2O_2$ | 3.33 | 0.029 | |

The composition of Example 7, i.e., that containing silicate and glyoxal trimer only, exhibited a gel time of 65 minutes at room temperature.

EXAMPLE 11

Following the general procedure set forth in Example 6, the compressive strength of the formulations of Examples 7-10 was determined at room temperature, employing for each formulation ten samples of Ottawa sand mixed with 36 ml of the particular composition being tested.

Two days after preparation, half of the sand samples for each composition were removed from the containers and strength measurements made, using the Instron tester. The load was applied at a rate of 5 mm/minute (or 0.2 inches/minute), recording the maximum load which could be applied before structural damage of the sample occurred. The values obtained were divided by 2.2 square inches, the area of the containers. After seven days' storage, the remaining sand samples were tested in a similar manner. The calculated pressure readings (psi) were converted to kilograms/cm². The results obtained are as follows:

TABLE 4

| Composition | Gel Accelerator | wt/volume Percent | Average Compressive Strength (Kilograms/cm²) | |
|---|---|---|---|---|
| | | | 2 days | 7 days |
| Product of Example 7 | — | — | 0.77 | 0.63 |
| Product of Example 8 | CaCl₂ | 0.083 | 3.28 | 3.36 |
| Product of Example 9 | H₂O₂ | 0.06 | 3.33 | 3.40 |
| Product of Example 10 | CaCl₂ H₂O₂ | 0.042 0.029 | 3.34 | 3.45 |

As seen from the above results, incorporation of gelling accelerators provides silicate-glyoxal trimer compositions with improved load bearing capacity.

What is claimed is:

1. In a liquid alkali metal silicate composition curable to a solid upon standing and comprising water, an alkali metal silicate and silicate acidogen, the improvement which comprises incorporating as the silicate acidogen, a glyoxal derivative which is 2,3-dihydroxy-1,4-dioxane or glyoxal trimer, whereby gelling of the resulting composition is inhibited sufficiently so that it is easily pumpable at an application temperature of 100° F. or higher.

2. The composition of claim 1 which comprises, by volume, 10 to 70 percent of an aqueous alkali metal silicate having an alkali metal oxide to silicon dioxide ratio of 1.0:3.0–4.0; about 0.25 to 1.05 moles of 2,3-dihydroxy-1,4-dioxane; and the balance water.

3. The composition of claim 1 which comprises, by volume, 10 to 70 percent of an aqueous alkali metal silicate having an alkali metal oxide to silicon dioxide ratio of 1.0:3.0–4.0; about 0.08 to 0.35 moles of glyoxal trimer; and the balance water.

4. The composition of claim 2 wherein the aqueous alkali metal silicate is sodium silicate containing from 25 to 50 percent solids by weight.

5. The composition of claim 2 which additionally contains a Group I–III metal salt reactive with the alkali metal silicate for imparting water-insolubility to the resulting silicate gel, which metal salt is sodium aluminate, aluminum chloride, copper sulfate, zinc chloride or calcium chloride.

6. The composition of claim 5 wherein the Group I–III metal salt is calcium chloride.

7. In a method for stabilizing soil which comprises contacting said soil with a sole liquid composition comprising 10 to 70 percent by volume of an aqueous alkali metal silicate having an alkali metal oxide:silicon dioxide ratio of 1:3.0–4.0, an acidogen for the silicate; and the balance water, the improvement which comprises employing as the silicate acidogen a glyoxal derivative which is 2,3-dihydroxy-1,4-dioxane or glyoxal trimer, whereby gelling of the resulting composition is significantly inhibited by comparison to that of a liquid alkali metal silicate-glyoxal composition and said composition is easily pumpable at an application temperature of 100° F. or higher.

8. The method of claim 7 wherein from 0.25 to 1.05 moles of 2,3-dihydroxy-1,4-dioxane is employed as the silicate acidogen.

9. The method of claim 7 wherein from 0.08 to 0.35 mole of glyoxal trimer is employed as the silicate acidogen.

10. The method of claim 7 in which the soil stabilizing composition additionally contains a Group I–III metal salt reactive with the alkali metal silicate to impart water-insolubility to the resulting silicate gel.

11. The method of claim 7 in which the soil stabilizing composition additionally contains hydrogen peroxide as an accelerator for curing the alkali metal silicate.

12. The method of claim 10 in which the soil stabilizing composition contains in addition to the Group I–III reactive salt, hydrogen peroxide as an accelerator for curing the alkali metal silicate.

* * * * *